United States Patent [19]
Smith et al.

[11] Patent Number: 5,781,747
[45] Date of Patent: Jul. 14, 1998

[54] METHOD AND APPARATUS FOR EXTENDING THE SIGNAL PATH OF A PERIPHERAL COMPONENT INTERCONNECT BUS TO A REMOTE LOCATION

[75] Inventors: Paul Smith, San Diego; Edward Romascan, La Jolla, both of Calif.

[73] Assignee: Mesa Ridge Technologies, Inc., San Diego, Calif.

[21] Appl. No.: 557,233

[22] Filed: Nov. 14, 1995

[51] Int. Cl.$^6$ .................................................. G06F 13/00
[52] U.S. Cl. .......................... 395/309; 395/308; 395/281; 395/822
[58] Field of Search .................... 395/281–283, 395/822, 882–884, 892, 306–309

[56] References Cited

U.S. PATENT DOCUMENTS

| | | | |
|---|---|---|---|
| 3,800,097 | 3/1974 | Maruscak et al. | 361/791 |
| 4,293,928 | 10/1981 | Baun | 395/884 |
| 4,322,792 | 3/1982 | Baun | 395/829 |
| 4,504,927 | 3/1985 | Callan | 395/822 |
| 4,706,189 | 11/1987 | Brockman | 395/892 |
| 4,787,027 | 11/1988 | Prugh et al. | 395/885 |
| 4,787,029 | 11/1988 | Khan | 395/281 |
| 4,847,750 | 7/1989 | Daniel | 395/846 |
| 4,954,949 | 9/1990 | Rubin | 395/200.01 |
| 4,959,833 | 9/1990 | Mercola et al. | 371/32 |
| 4,961,140 | 10/1990 | Pechanek et al. | 395/285 |
| 5,006,981 | 4/1991 | Beltz et al. | 395/281 |
| 5,191,655 | 3/1993 | Sarkissian | 395/284 |
| 5,274,765 | 12/1993 | Le Gallo | 395/884 |
| 5,287,460 | 2/1994 | Olsen et al. | 395/883 |
| 5,325,491 | 6/1994 | Fasig | 395/281 |
| 5,335,329 | 8/1994 | Cox et al. | 395/282 |
| 5,379,384 | 1/1995 | Solomon | 395/308 |
| 5,392,407 | 2/1995 | Heil et al. | 395/293 |
| 5,396,602 | 3/1995 | Amini et al. | 395/293 |
| 5,430,847 | 7/1995 | Bradley et al. | 395/310 |
| 5,497,498 | 3/1996 | Taylor | 395/800 |
| 5,517,623 | 5/1996 | Farrell et al. | 395/281 |
| 5,572,525 | 11/1996 | Shen et al. | 370/257 |

OTHER PUBLICATIONS

"PCI Local Bus Specification"; Revision 2.1—Production Version; Jun. 1, 1995.

*Primary Examiner*—Jack B. Harvey
*Assistant Examiner*—Sumati Lefkowitz
*Attorney, Agent, or Firm*—Knobbe, Martens, Olson & Bear, LLP

[57] ABSTRACT

A peripheral component interconnect (PCI) extension/expansion system wherein the PCI Local Bus can be extended from a computer system's motherboard to another location. A PCI translation card and remote PCI board communicate via a transmission medium to relay the signals from the PCI local bus to a remote location. The signals are then provided to remote expansion slots, where additional PCI components may be operated. Further, additional PCI connectors are provided for more add-in boards.

15 Claims, 4 Drawing Sheets

METHOD AND APPARATUS FOR EXTENDING THE SIGNAL PATH OF A PERIPHERAL COMPONENT INTERCONNECT BUS TO A REMOTE LOCATION

FIELD OF THE INVENTION

This invention relates to extension of a computer bus, and in particular to the extension and expansion of a peripheral component interconnect (PCI) bus to allow additional expansion cards to be utilized.

BACKGROUND OF THE TECHNOLOGY

A communications interface or input/output bus is typically used in computer systems to interconnect separate devices such as processors, memories, and peripherals. A current need exists to expand the number of bus connections available on a computer's I/O bus beyond the number supplied by the computer manufacturer in a computer system. There has also been a concurrent need to extend the I/O bus located in the computer system to some point physically distant from the computer system.

Bus expansion provides a method of attaching more devices to a computer than is provided for by the computer manufacturer. Bus extension provides a method of attaching to a computer system devices located physically distant from that computer system.

A peripheral component interconnect (PCI) bus is a physical interconnect apparatus which was developed in response to the above problems and is intended for use between highly integrated peripheral controller components and processor/memory systems. A PCI Local Bus is intended as a standard interface at the component level in much the same way that ISA, EISA and Microchannel™ buses are standard interfaces at the board level. Just as ISA, EISA and Microchannel™ buses provide a common I/O board interface across different platforms and processor generations, the PCI local bus is intended to be a common I/O component interface across different platforms and different processor generations.

The PCI bus is a system board-resident bus that can be populated with adapters requiring fast accesses to each other and/or system memory. The adapters also can be accessed by the host processor at speeds approaching that of the processor's full native speed. The bridge between the host bus and the PCI bus may be designed to buffer up multiple writes initiated by the host processor to the same PCI target.

The specification for the PCI Local Bus is intended to standardize a local bus on which a large variety of I/O components can be directly connected without "glue" logic, or direct component interconnection. Unfortunately, the PCI local bus is subject to several limitations. One of the limitations of the PCI local bus is that it is intended to connect closely co-located components. Typically, all components must be co-located within thirteen inches due to unterminated bus lines and propagation delays.

Also, the trace length for peripheral component interconnect (PCI) add-in devices is limited to 1.5 inches from the motherboard of a computer for PCI signals and 2.5 inches for the primary clock. This limitation minimizes distortion of signal due to stub length and is found in the document Peripheral Component Interconnect (PCI) Local Bus Specification Revision 2.0, dated Apr. 30, 1993 ("the PCI specification") published by the PCI Special Interest Group, the contents of which is fully incorporated herein by reference. The PCI specification states the signal path from the connector to the PCI chip must be within 1.5 inches to maintain proper timing.

One of the uses of the PCI Local Bus is to add-in optional printed circuit boards that extend the capabilities of the computer. These add-in boards electrically connect to the PCI Local Bus by mating connectors (called PCI connectors) attached to the motherboard and the add-in board. A computer motherboard typically has a small number (two or three) of PCI connectors, thereby limiting the number of PCI compliant add-in boards a computer can receive. This limitation is caused by layout constraints and propagation delays.

The PCI specification also restricts the location of the add-in boards to PCI connectors located on the motherboard. As discussed above, due to layout constraints and propagation delays, all PCI Local Bus components must be located within thirteen (13) inches of each other. This limitation restricts bus extension.

An improvement to the technology would be a system that allowed extension of the PCI local bus from the computer system's motherboard to another location. This extension could be as small as several inches, however, it could also extend many feet. A second improvement of the technology would be to provide for connection of additional PCI connectors at the distant end of the extension for more add-in boards. Such a system would readily permit expansion of the computer so it may be adapted to meet the requirements of the user.

A third improvement to the technology would be to provide a PCI local bus extension and expansion system which is connected through the computer system via an add-in board on the PCI local bus and which is connected to the computer system through an existing PCI connector. A still further improvement would be to provide the capability to cascade many extension and expansion systems by connecting a PCI local bus extension and expansion system add-in board to the PCI connector of another PCI local bus extension and expansion system. The cascaded systems would provide the capability to add hundreds of processor, memory and/or peripheral add-in boards.

SUMMARY OF THE INVENTION

The present invention comprises a novel system and method for extending the distance over which PCI add-in boards can operate in conjunction with the computer. This system includes a method of converting PCI local bus signalling protocol to signals which can be used on cable or other transmission medium, a method for reconstructing a fully functional PCI local bus at the far end of the transmission medium, and a method of adding additional PCI connectors to the remote reconstructed PCI bus.

The current invention uses PCI bridges. One of the constraints of the PCI local bus is that a component attached to the PCI local bus can only draw a single electrical load from the bus. That is, only one device can be directly attached to the PCI local bus at any given time. There is also an overall maximum of ten loads which can be simultaneously attached to the bus, either directly or indirectly. The PCI specification defines PCI bridges as devices such as ASICS or other VLSI devices, which are used to connect multiple devices or loads to a PCI local bus to circumvent this load limitation.

A PCI bridge is divided into a primary local bus and a secondary local bus. The primary PCI local bus of a PCI bridge is attached to the host PCI bus. This primary local bus presents a PCI compliant single load to the PCI bus. The secondary PCI local bus can then accommodate ten more loads and therefore have multiple components attached to it. The PCI bridge presents a PCI local bus compliant interface to both the primary PCI local buses and the secondary PCI local buses.

The present invention uses a PCI bridge on both the add-in board and on the remote end of the extension and expansion system. This provides a PCI compliant interface to the primary PCI local bus while providing a secondary PCI local bus to the extension and expansion system.

The present invention consists of four assemblies. First, an add-in board electrically connects a computer's PCI local bus via a motherboard PCI connector. This add-in board includes hardware and firmware for translating the PCI local bus signalling protocol to electrical signals suitable for transmission across a medium such as a cable. The second assembly of the present invention is a type of transmission media. The transmission media can be any device capable of transmitting the signal from the add-in board to the remote interface. Typically, this can be a pleated foil cable, a fiber optic cable or printed circuit board. The system also contains a remote add-in board which converts the transmitted electrical signals from the transmission medium back to the PCI local bus signalling protocol. Like the initial add-in board, this board includes the hardware and firmware necessary for translating the electrical signals across the cable back to the PCI local bus signalling protocol. Finally, the system includes a backplane which distributes the PCI local bus signals to PCI connectors located on the backplane.

By inserting the first add-in board into the computer system's motherboard, the PCI local bus can be extended to the remote backplane. Because the backplane contains PCI connectors, additional add-in boards can be inserted into each PCI connector on the backplane, thereby allowing the PCI signalling protocol to be transmitted to additional backplanes. Of course, PCI compliant interface cards can also be plugged into each PCI connector on the backplane. This extension and expansion feature of the present invention allows the capability to add almost unlimited numbers of processors, memories and/or peripheral add-in boards.

By using this unique method of signal conversion and transfer, the present invention overcomes the trace length limitations and the component co-location limitation found in the PCI specification. Previously, it was believed impossible to transmit the signals at a speed necessary to maintain full PCI compliant timing. Not only is this accomplished in the present invention, but it is achieved in a simple manner. This allows use of the high-speed PCI Local Bus while maintaining the flexibility of adding any number of expansion cards. Also, because of the simplicity of the invention, the PCI extension and expansion can be accomplished in a cost effective manner.

DETAILED DESCRIPTION OF THE PREFERRED EMBODIMENTS

The present invention involves extending and expanding a peripheral component interconnect (PCI) system local bus to a remote location. At the remote location, additional PCI connectors are provided to accommodate multiple add-in boards. This allows an external chassis to hold expansion cards that communicate with the host PCI bus, thereby increasing the number of add-in boards the host computer 10 can use.

Figure 1:
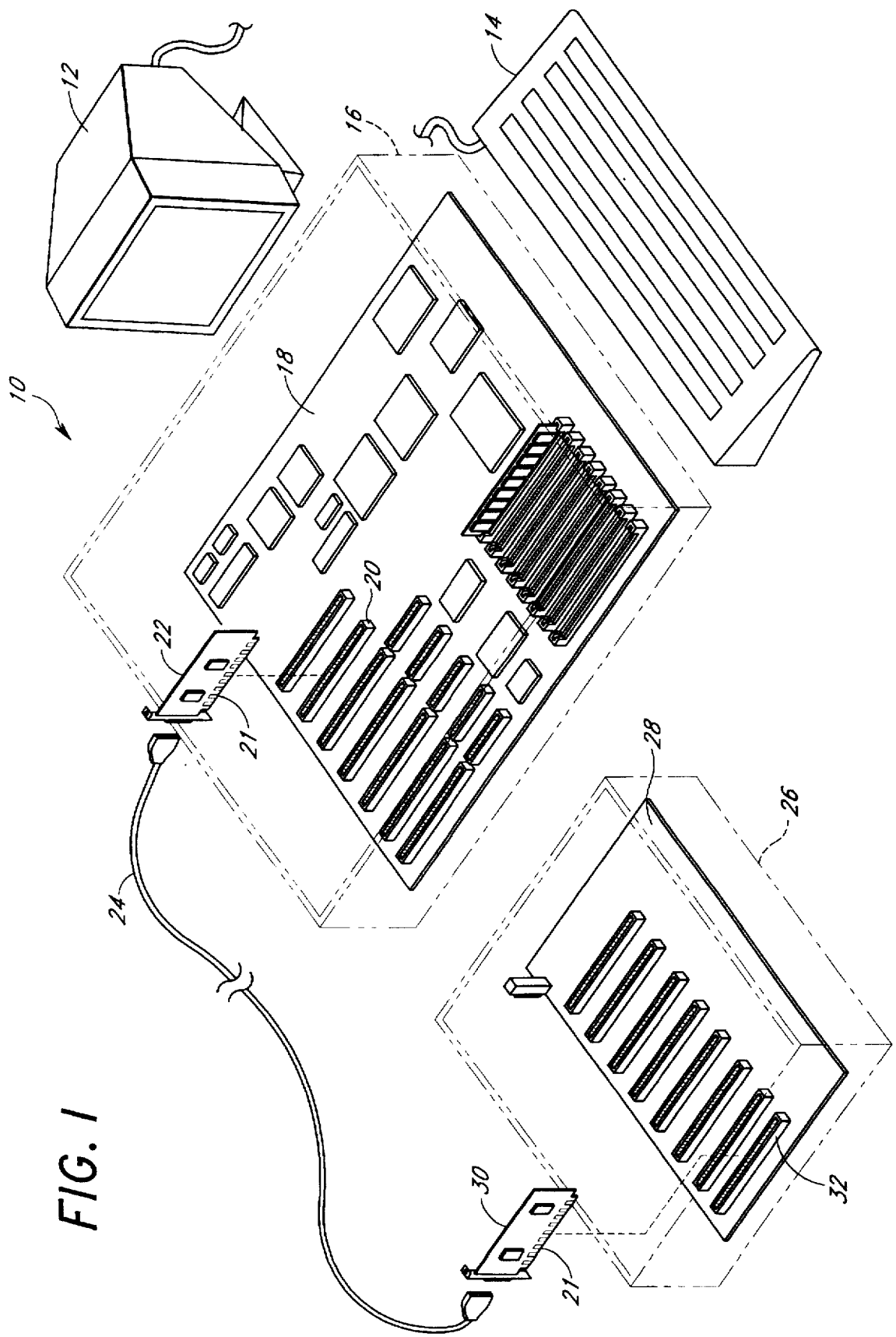
FIG. 1 is a perspective view of a computer and external chassis using the expansion boards of the present invention.

FIG. 1 depicts a perspective view of a host computer 10 in accordance with the present invention. As shown in FIG. 1, the computer 10 consists of a monitor 12, a keyboard 14 and a chassis 16 containing a motherboard 18. The motherboard 18 contains the basic circuitry of the computer 10. This will include the central processing unit, memory chips, and expansion slots 20. In a PCI compliant system, only 2 or 3 of the expansion slots 20 will directly interface with the PCI bus. In the present invention, a PCI translation card 22 is inserted into one of the expansion slots 20 interfacing with the host PCI bus. The translation card 22 is an add-in card containing the necessary line drivers and receivers to transmit address and data signals across the transmission cable 24. Specific details of the translation card 22 will be provided below in FIG. 4. As is well known in the art, the translation card 22 contains connectors 21 that insert into the expansion slots 20. The connectors 21 allow electrical communication between the PCI bus and the translation card 22.

In order for the signals on the translation card 22 to be transmitted external to the computer 10, the translation card 22 is connected to a transmission cable 24. The transmission cable 24 electrically connects the PCI translation card 22 to a remote PCI board 30. The remote PCI board is located in an external chassis 26.

A backplane 28 is mounted within the external chassis 26. The backplane 28 contains a plurality of remote expansion slots 32. In the present invention there are seven (7) remote expansion slots 32 and one slot for the remote PCI board on each backplane 28. The remote PCI board 30 contains a connector 21. The connector 21 is inserted into the remote PCI board slot to provide electrical communication between the remote PCI board 30 and the backplane 28. The remote PCI board 30 also contains a remote PCI bus. When the remote PCI board 30 is attached to the backplane 28 via the connector 21, all the remote expansion slots 32 can communicate with the PCI bus on remote PCI board 30.

The communication between the remote PCI board 30 and the PCI translation card 22 is two-way. This means that PCI signals received at the remote PCI board can be transmitted back through the cable 24 to the PCI translation card 22, and ultimately to the host PCI bus communicating with the motherboard 18. This two-way communication feature allows add-in cards mounted in the external chassis 26 to both receive and transmit electrical signals from the host PCI bus mounted on the motherboard 18.

Figure 2:
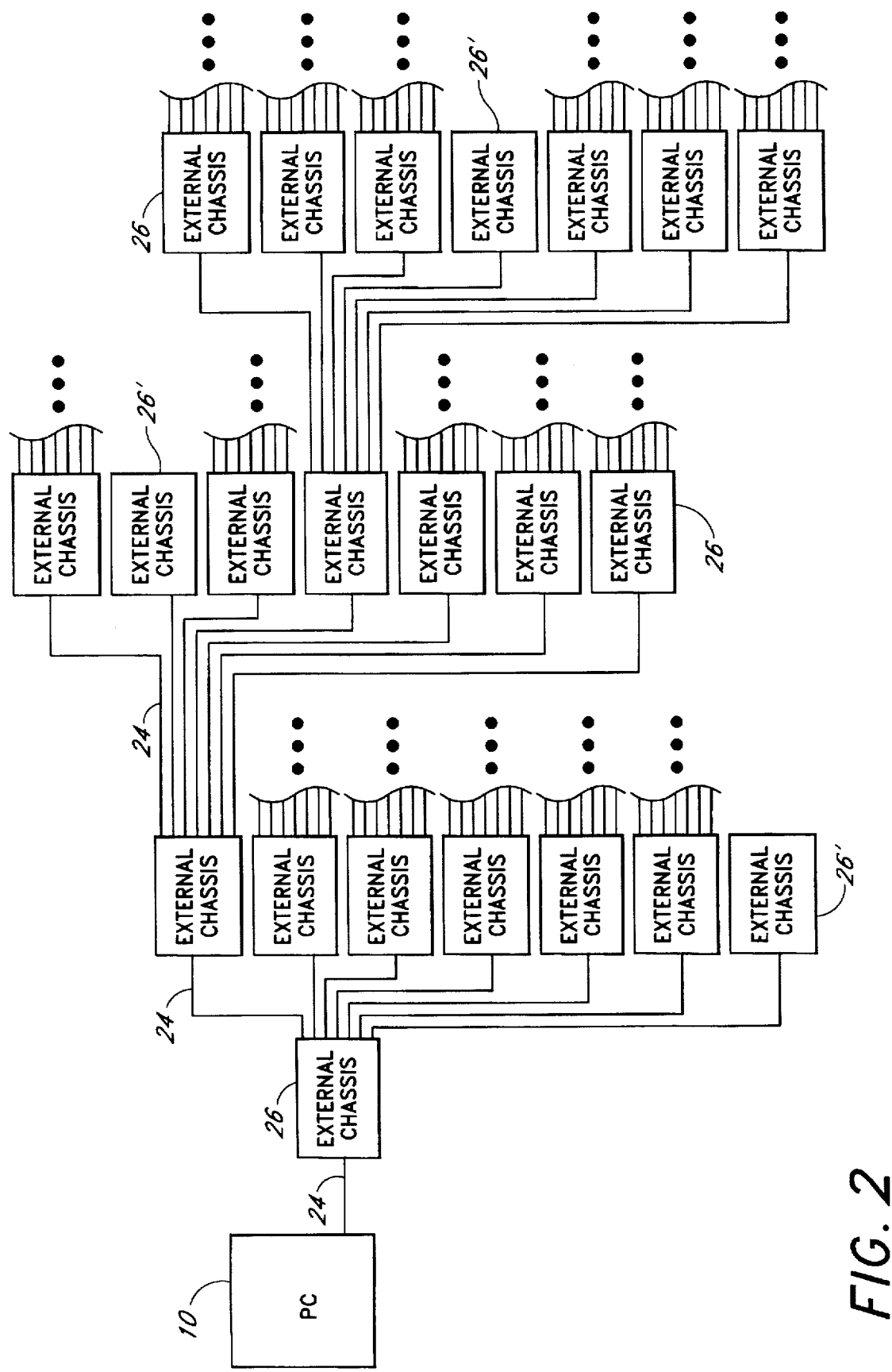
FIG. 2 is a block diagram illustrating the extension and expansion features of the present invention.

The extension and expansion capabilities of the present invention are further shown in FIG. 2. FIG. 2 shows a block diagram of one potential extension and expansion scheme of the present invention. In FIG. 2, the host computer 10 is connected through a PCI translation card 22 (FIG. 1) through the transmission cable 24 to a remote PCI board 30 (shown in FIG. 1) mounted in the external chassis 26. Additional PCI translation cards 22 can be mounted in the remaining seven (7) remote expansion slots 32 (shown in FIG. 1) inside external chassis 26. From each of these PCI translation cards 22, a transmission cable 24 connects to a remote PCI board 30 mounted in an additional external chassis 26.

Alternatively, any or all the remote expansion slots 32 on the backplane 28 can be filled with add-in boards. If all the remote expansion slots 32 are populated with add-in boards, no additional extension will be available from that backplane 28. This embodiment is shown by external chassis 26'. By using a combination of extension and expansion in multiple external chassis, the number of add-in boards ultimately communicating with the host computer 10 is great. The only limitation is derived from the number of backplane designations permitted in the PCI specification. The PCI specification currently allows 256 backplane designations. Of course, if future PCI specifications increase the number of backplane designations allowed, more external chassis 26 and backplanes 28 can be attached to the host computer 10. Of course, not all remote expansion slots 32 in external chassis 26 need to have add-in boards or remote PCI boards 30 installed. Some slots could remain empty or some slots could have add-in boards while others are mounted with PCI translations cards 22 to connect further external chassis 26.

Figure 3:
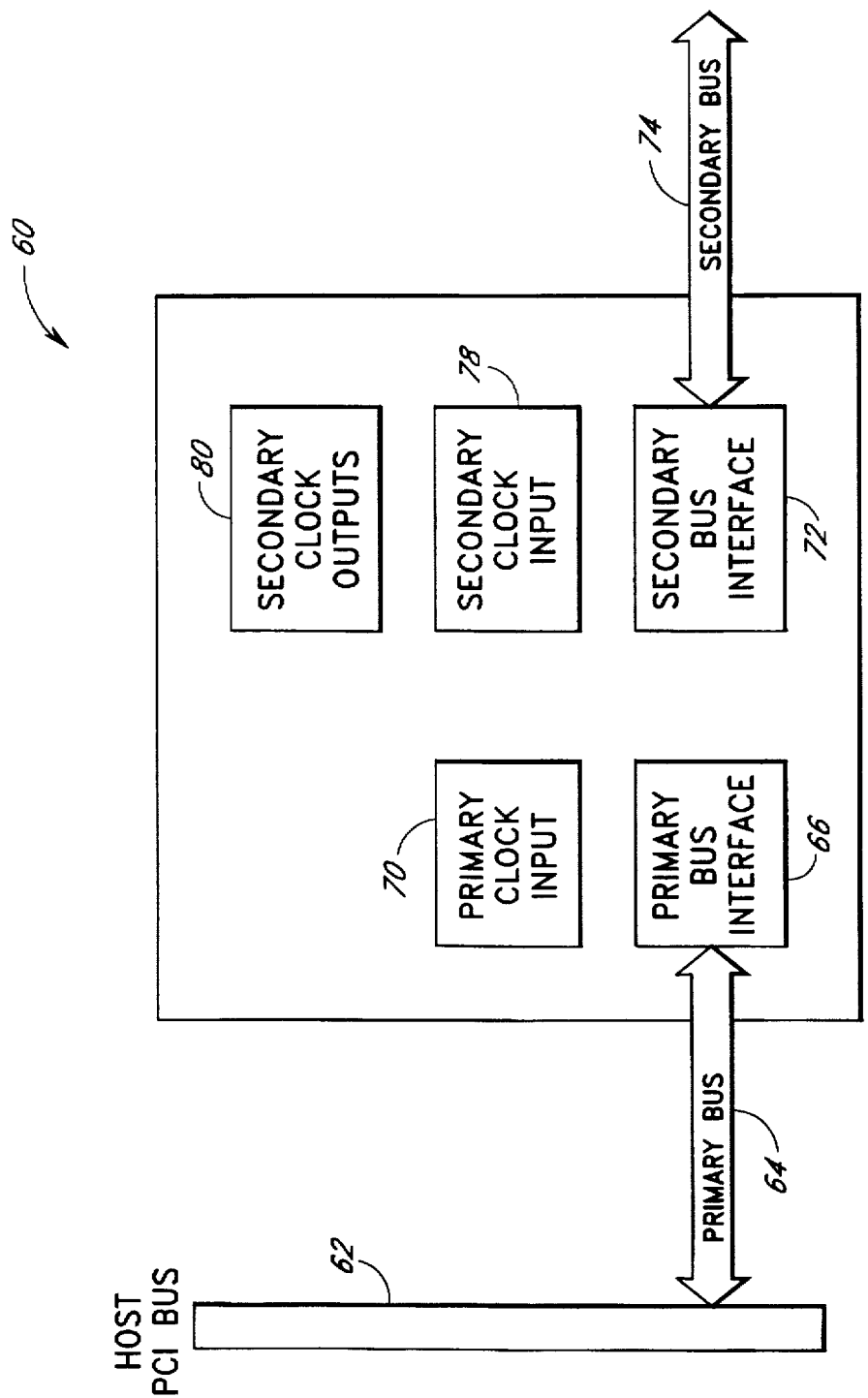
FIG. 3 is a block diagram illustrating the PCI bridging of the present invention.

According to the PCI specification, PCI signals coming from the motherboard to PCI add-in boards have trace length limits of 1.5 inches for PCI signals and 2.5 inches for the primary clock. The present invention overcomes these trace length limits by using a PCI bridge to establish a primary and secondary PCI bus. In this manner, the PCI signals are transmitted to the primary PCI bus. The primary bus is located within the physical trace length limits of the PCI specification. This satisfies the trace length requirements. The PCI signal can then be transmitted along the secondary PCI bus over a longer distance. In FIG. 3, one means for establishing a primary bus 64 and secondary bus 74 is shown. The subject matter illustrated in FIG. 3 is representative of a PCI bridge 60. The host PCI bus 62 transmits a PCI signal along the primary bus 64 to the primary bus interface 66. The trace length of this transfer is within the 1.5 inches for PCI signals as specified in the PCI specification. Although not shown in FIG. 3, the host PCI bus 62 can also provide the clock signal for the primary clock input 70. This trace length will also be the 2.5 inches required by the PCI specification.

After the primary bus interface 66 receives the PCI signal from the primary bus 64, the signal is transferred to the secondary bus interface 72 and then along the secondary bus 74. The timing of this transfer is controlled by the primary clock input 70 and a secondary clock input 78. Available on the PCI bridge 60 are secondary clock outputs 80 and the use of these will be discussed below in FIG. 4.

Figure 4:
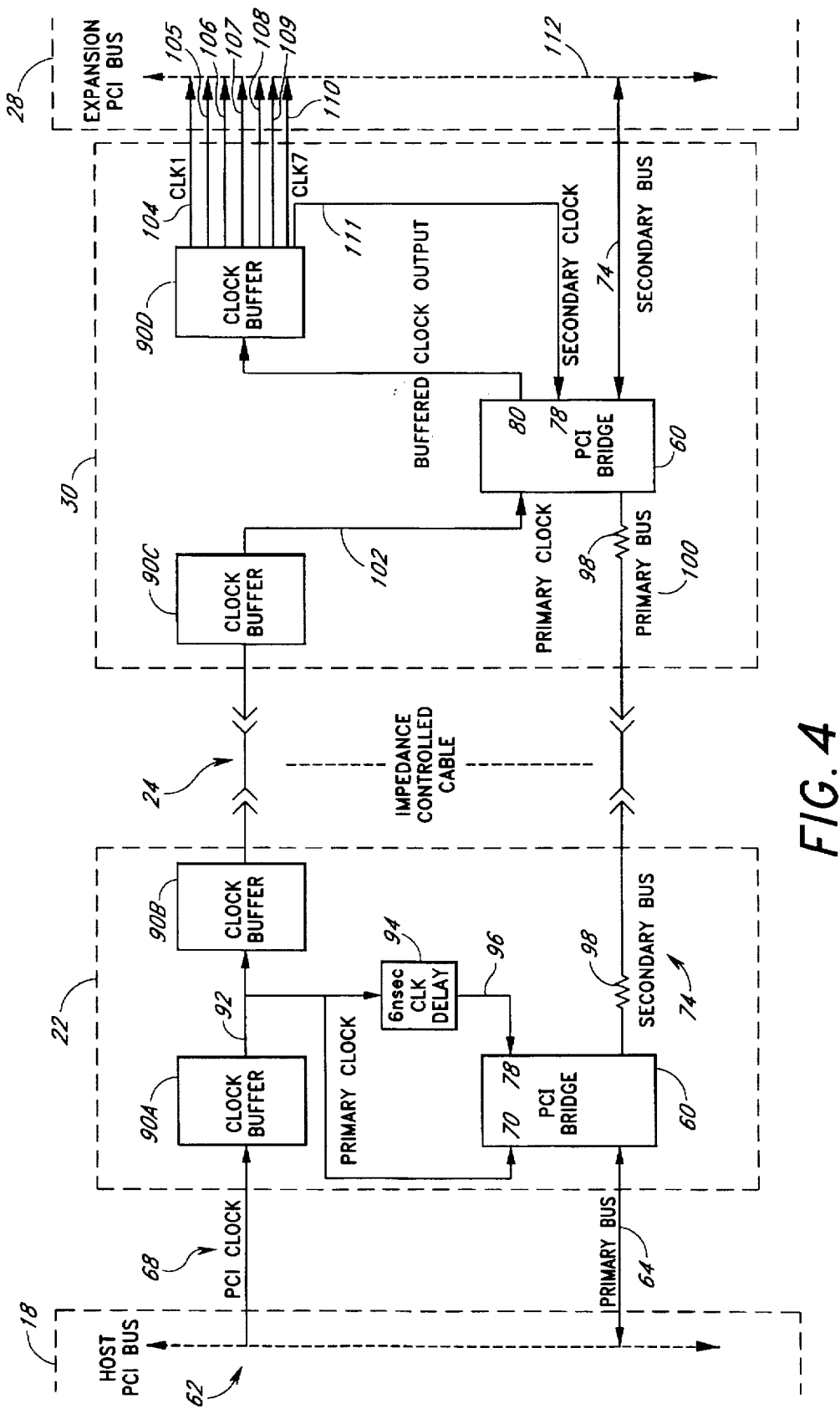
FIG. 4 is a block diagram illustrating the components of one preferred embodiment of the system of the present invention.

The overall operation of the invention will be described by reference to FIG. 4. FIG. 4 shows a schematic block diagram of the motherboard 18 connected to the PCI translation card 22 which is connected via the transmission cable 24 to the remote PCI board 30 which is located on an expansion PCI bus 112 mounted upon the backplane 28. On the motherboard 18, the host PCI bus 62 transmits a signal along the primary bus 64 and also sends out a PCI clock signal 68. The signal from the primary PCI bus 64 is received by the PCI bridge 60. In the preferred embodiment the PCI bridge is a DECchip 21050 PCI-PCI Bridge. This DECchip provides all the features described above with reference to the device shown in FIG. 3. Of course, it will be appreciated that other bridge chips could also be used as well as independent circuitry to accomplish both a primary PCI interface and a secondary PCI interface.

The PCI clock signal 68 from the host PCI bus 62 is received by a clock buffer 90A. The clock buffer 90A of the present invention is embodied in a MicroLinear ML65245 BiCMOS non-inverting octal transceiver. The MicroLinear chip has 8 channels supporting a propagation delay of 1.5 nanoseconds, while driving a 50 picoFarad load at 50 MHz switching frequency. These features provide the proper timing requirements, making the MicroLinear chip useful in the present invention. Of course, other clock buffers may be used, but each clock buffer must be matched with both the PCI bridge and the transmission medium chosen.

The first clock buffer 90A is included so that the PCI host bus 62 is limited to only one load as required by the PCI specification. From the clock buffer 90A, a buffered clock signal 92 is provided to a second clock buffer 90B, input to the primary clock signal 70 of the PCI bridge 60, and sent to a clock delay 94. As can be appreciated, without the first clock buffer 90A, the PCI host bus 62 would see three loads. These loads would be the clock buffer 90B, the primary clock input 70 and the clock delay 94.

The clock delay 94 provides a 6 nanosecond delay following which the signal is input into the secondary clock input 78 of the PCI bridge. Because the primary clock input 70 receives an undelayed clock signal 92, the signal received via the secondary bus 74 is delayed 6 nanoseconds from the one on the primary bus 64. Because of limitations in the PCI bridge 60, the two clocking domains must operate at the same frequency and must be synchronous to each other. Here, the 6 nanosecond delay provided by the clock delay 94 is within the bridge specification. As will be shown later, this delay is designed to match the speed of the transmission medium 24.

The buffered clock signal 92 is input into the clock buffer 90B after which it is sent along the transmission cable 24. The clock buffer 90B is used to match the impedance of the transmission medium 24. In the preferred embodiment, the MicroLinear ML65245 chip, used as the clock buffer 90B has a 75 ohm termination resistance. This matches the impedance of the impedance controlled cable 24 to help suppress the noise caused by transmission line effects such as reflection. Because the MicroLinear chip has a 75 ohm termination resistance, additional impedance matching is not required. If a clock buffer without a termination resistance is used, an external resistor in series with the clock buffer 90B is required to match the impedance of the transmission medium 24.

One output of the PCI bridge 60 is connected to the secondary bus 74. A shunt resistor 98 is mounted along this bus. In the preferred embodiment, the shunt resistor has an impedance of 22 ohms. This resistance is dependent on the type of chips used to achieve the PCI bridge 60 and the specific transmission medium 24 used. A second shunt resistor 98 is mounted at the input of the PCI bridge 60 on the remote PCI board 30. The two shunt resistors are designed to control voltage overshoots and undershoots. The use of shunt resistors to prevent voltage overshoots and undershoots is well known in the art. Such prevention is necessary since overshooting and undershooting of signals can cause latch-ups in the bridge chips 60. In particular, if the overshooting or undershooting of signals traveling to the PCI bridge 60 is too large, the PCI bridge 60 will latch-up. Latch-ups of the PCI bridge 60 can cause chip failure. The voltage dropped across the shunt resistors 98 is designed to compensate for any overshooting or undershooting, and to thereby prevent any latch-ups.

The transmission cable 24 of the preferred embodiment is a pleated foil cable such as the 90111 Series manufactured by 3M Electronic Products Division. As mentioned above, this cable has a 75 ohm resistance which is matched by the MicroLinear chip in the clock buffer 90B. This pleated foil cable is ideal for the present invention due to the high digital transfer rates. The controlled impedance features of the pleated foil cable allow digital data rates of up to 200 megabits per second per conductor with excellent signal fidelity. The time delay of the cable is 1.52 nanoseconds/foot. This allows four feet of pleated foil cable to have a time delay of 6.08 nanoseconds, matching the delay provided by the clock delay 94.

In accordance with the above description, the transmission cable 24 conveys a buffered clock signal and a PCI bus signal from the secondary bus 74 to the remote PCI board 30. As discussed above, the preferred embodiment of the present invention uses four feet of pleated foil cable to match the time delay of the clock delay 94. The transmission time across this distance correlates with the 6 nanosecond delay added by the clock delay 94. This allows the undelayed clock signal received across the transmission cable 24 to be in sync with the delayed PCI bus signal found on the secondary bus 74.

On the remote PCI board 30, the buffered clock signal from the transmission cable 24 is received by a third clock buffer 90C. This buffer 90C will ensure that the input signal is closely matched by the output signal. In this way, a clean remote buffered clock signal is provided on line 102 as the primary clock input 70 to the PCI bridge 60 mounted on the remote PCI board 30.

The signal from the secondary PCI bus 74 is received by the primary bus 100 from the transmission cable 24. This signal is then input into the PCI bridge 60. The PCI bridge 60 outputs a secondary bus signal along a secondary bus 101 and a buffered clock output along the secondary clock output 80. The secondary clock output 80 is then input into a fourth and final clock buffer 90D. This clock buffer provides eight separate clock signals. Seven of the clock signals are transmitted on lines 104 through 110. The eighth clock signal is communicated on line 111 as the input for the secondary clock 78 of the PCI bridge 60. The clock signal lines 104 through 110 are connected to remote expansion slots 32 mounted upon the back plane 28. This provides each expansion slot with an independent clock signal. By providing each expansion slot an independent clock signal, an electrical short or other problem on one expansion slot will not have any effect on the other expansion slots.

The secondary bus 101 is connected to the expansion PCI bus 112 on the back plane 28. The combination of the clock signal lines 104 through 110 and the PCI bus 112 provides seven independent PCI compliance expansion slots on the back plane 28.

By using the present invention, a PCI bus can be extended. This allows transmission of the PCI bus to a remote backplane containing multiple expansion slots. By cascading combinations of remote backplanes, the number of expansion slots available to the PCI bus is greatly increased without sacrificing the performance advantages of a local bus.

Of course, numerous variations and modifications of the invention will become readily apparent to those skilled in the art. Accordingly, the scope of the invention should not be construed as limited to the specific embodiment depicted and described but rather, the scope is defined by the appended claims. The invention may be embodied in other specific forms without departing from its spirit or essential characteristics. The detailed embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

We claim:

1. A system for extending a signal path of a host PCI bus comprising:
    a first bus interface communicating with said host PCI bus, the first bus interface presenting only a single load to the host PCI bus;
    a transmission medium having a first and second end, said first end electrically connected to said first bus interface;
    a second bus interface electrically connected to said second end of said transmission medium; and
    a second PCI bus communicating with said second bus interface, wherein the first bus interface comprises:
    an expansion board;
    a PCI bridge connected to said expansion board;
    a primary bus having a primary bus signal connected to said PCI bridge;
    a primary clock input connected so as to receive a clock signal from said host PCI bus;
    a secondary bus electrically connected to receive said primary bus signal from said primary bus to generate a secondary bus signal; and
    a secondary clock input connected so as to receive a delayed clock signal from said host PCI bus, wherein the secondary bus signal is the primary bus signal delayed by the delayed clock signal.

2. The system of claim 1 wherein the transmission medium is a copper wire cable.

3. The system of claim 1 wherein the transmission medium is a fiber optic cable.

4. The system of claim 1 wherein the transmission medium is a printed circuit board.

5. The system of claim 1 wherein the transmission medium is a pleated foil cable.

6. The system of claim 1 wherein the second bus interface comprises:
    an expansion board;
    a PCI bridge connected to said expansion board; and
    a clock buffer connected so as to receive a clock signal from said PCI bridge.

7. The system of claim 1 further comprising a plurality of expansion slots mounted on a backplane, said second bus interface communicating with said second PCI bus via a remote PCI board.

8. The system of claim 7 wherein said expansion slots communicate with said second PCI bus.

9. The system of claim 7 wherein the signal path of the second PCI bus is extended to a second backplane.

10. The system of claim 1 further comprising:
    a plurality of expansion slots mounted on a backplane, said second bus interface communicating with said second PCI bus via one of said expansion slots.

11. The system of claim 1, wherein the delay in the clock signal matches the transmission speed of the transmission medium.

12. A method of extending a signal path of a host PCI bus to a second PCI bus via a first bus interface having a first PCI bridge, a transmission medium, and a second bus interface having a second PCI bridge comprising the steps of:
    (a) receiving a bus signal and a clock signal from said host PCI bus at said first bus interface, whereby said host PCI bus detects only a single load;
    (b) delaying said clock signal an amount dependant on said transmission medium;
    (c) transmitting said bus signal and said clock signal to said second bus interface via said transmission medium;

(d) receiving said signals at said second bus interface; and (e) generating a PCI signal at said second bus interface.

13. The method of extending a signal path of a host PCI bus in claim 12 wherein said receiving and transmitting steps are accomplished using a PCI bridge.

14. A method of expanding a host PCI bus to a plurality of expansion slots mounted on a backplane, said expansion slots being electrically connected to a second PCI bus, wherein said second PCI bus communicates to said host bus via a first bus interface having a first PCI bridge, a transmission medium, and a second bus interface having a second PCI bridge comprising the steps of:

(a) receiving a bus signal and a clock signal from said host PCI bus at said first bus interface, whereby said host PCI bus detects only a single load;

(b) delaying said clock signal an amount dependant on said transmission medium;

(c) transmitting said bus signal and said clock signal to said second bus interface via said transmission medium;

(d) receiving said signals at said second bus interface;

(e) generating a PCI signal at said second bus interface; and (f) communicating said PCI signal to said second PCI bus.

15. The method for expanding a host PCI bus in claim 14 wherein said receiving and transmitting steps are accomplished using a PCI bridge.

\* \* \* \* \*